United States Patent
Kita

(10) Patent No.: US 9,198,043 B2
(45) Date of Patent: Nov. 24, 2015

(54) CONTROL SYSTEM, INFORMATION PROCESSING APPARATUS, TERMINAL DEVICE, CONTROL METHOD, AND COMPUTER READABLE MEDIUM

(71) Applicant: CASIO COMPUTER CO., LTD., Shibuya-ku, Tokyo (JP)

(72) Inventor: Kazunori Kita, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/105,013

(22) Filed: Dec. 12, 2013

(65) Prior Publication Data

US 2014/0181510 A1    Jun. 26, 2014

(30) Foreign Application Priority Data

Dec. 20, 2012  (JP) ................................. 2012-278044

(51) Int. Cl.
*G06F 21/00* (2013.01)
*H04W 12/08* (2009.01)
(Continued)

(52) U.S. Cl.
CPC ............... *H04W 12/08* (2013.01); *G06F 21/31* (2013.01); *G06F 21/6209* (2013.01); *H04W 12/06* (2013.01); *G06F 2221/2105* (2013.01); *G06F 2221/2147* (2013.01)

(58) Field of Classification Search
USPC ........................................................ 713/165
See application file for complete search history.

(56) References Cited

U.S. PATENT DOCUMENTS 4,786,900 A * 11/1988 Karasawa et al. ............. 340/5.32
6,510,642 B2 * 1/2003 Riener ......................... 42/70.11
(Continued)

FOREIGN PATENT DOCUMENTS

JP    2004289208 A    10/2004
JP    2006020003 A    1/2006
(Continued)

OTHER PUBLICATIONS

Two-Photon 3D Optical Data Storage|file:///C:/Users/mrahman4/Documents/e-Red%20Folder/14105013/Two-Photon%203D%20Optical%20Data%20Storage.pdf|Lott et al.|pp. 2425-2429|2011.*
(Continued)

*Primary Examiner* — Mahfuzur Rahman
(74) *Attorney, Agent, or Firm* — Holtz, Holtz, Goodman & Chick PC

(57) ABSTRACT

A control system includes an information processing apparatus and a terminal device which perform wireless communication with each other, wherein the terminal device is moved with a user, and includes: a switching request signal transmission section that transmits a switching request signal, the information processing apparatus includes: a received signal strength measuring section that measures a received signal strength of a transmitted signal; and a control section that sets the received signal strength measured when receiving the switching request signal to a switching threshold value, and switches the information processing apparatus from the second status to the first status when the received signal strength becomes less than the switching threshold value, and switches it from the first status to the second status when the received signal strength becomes larger than the switching threshold value.

20 Claims, 8 Drawing Sheets

(51) Int. Cl.
*G06F 21/62* (2013.01)
*G06F 21/31* (2013.01)
*H04W 12/06* (2009.01)

(56) References Cited

U.S. PATENT DOCUMENTS

| | | | |
|---|---|---|---|
| 6,664,899 B1* | 12/2003 | Tsuchihashi | 340/12.22 |
| 7,551,920 B1* | 6/2009 | Ngan | 455/417 |
| 7,668,556 B2 | 2/2010 | Yokoshi et al. | |
| 7,725,703 B2 | 5/2010 | Hunter et al. | |
| 2002/0196123 A1* | 12/2002 | Diehl et al. | 340/5.64 |
| 2003/0006879 A1* | 1/2003 | Kang et al. | 340/5.61 |
| 2006/0164208 A1* | 7/2006 | Schaffzin et al. | 340/5.64 |
| 2009/0006846 A1* | 1/2009 | Rosenblatt | 713/159 |
| 2013/0132016 A1* | 5/2013 | Dennis et al. | 702/85 |

FOREIGN PATENT DOCUMENTS

| | | |
|---|---|---|
| JP | 2006323814 A | 11/2006 |
| JP | 2006331237 A | 12/2006 |
| JP | 2010-157253 A | 7/2010 |

OTHER PUBLICATIONS

Japanese Office Action dated Feb. 24, 2015 (and English translation thereof), issued in counterpart Japanese Application No. 2012-278044.

Kikawa, et al., "A proposal and evaluation of the method to detect leaving one's desk using the RSSI of Bluetooth", IPSJ SIG Technical Report, Jan. 30, 2009, vol. 2009, No. 8, pp. 95-102, 2009-MBL-48.

* cited by examiner

CONTROL SYSTEM, INFORMATION PROCESSING APPARATUS, TERMINAL DEVICE, CONTROL METHOD, AND COMPUTER READABLE MEDIUM

CROSS-REFERENCE TO RELATED APPLICATIONS

This application is based upon and claims the benefit of priority from the prior Japanese Patent Application No. 2012-278044 filed on Dec. 20, 2012, the entire contents of which are incorporated herein by reference.

BACKGROUND OF THE INVENTION

1. Field of the Invention

The present invention relates to a control system, an information processing apparatus, a terminal device, a control method, and a computer readable medium.

2. Description of the Related Art

Heretofore, in order to perform access/browsing restriction in a personal computer placed in an office and the like, for example, the personal computer is put in a login status or unlock status by a method such as the three methods described below, after the personal computer is put in a logout status or lock status when a predetermined time has passed or when a user executes a logout operation or lock operation.

Concretely, the first method is performing authentication by causing a user to input an ID and a password.

The second method is performing authentication by connecting a hardware key (hardware lock, dongle) such as an IC card or a USB memory, which previously stores authentication information, to the personal computer.

The third method is performing biometric authentication by obtaining biological information such as a fingerprint and an iris pattern from a user. This method is described in, for example, Japanese Patent Application Laid-Open Publication No. 2010-157253.

However, the first method requires a user to remember the password, which takes time and effort. There is also a possibility that a password input operation is peeked by other people and/or that the password is cracked from words and actions of a user, and thereby security is compromised.

The second method does not require a user to remember the password. However, it requires a user to own/carry the hardware key, which takes time and effort. There is also a possibility that the hardware key is stolen and accordingly security is compromised.

The third method does not require a user to remember the password, or to own/carry the hardware key. However, an authentication apparatus for performing biometric authentication is relatively large, which runs up costs.

BRIEF SUMMARY OF THE INVENTION

The object of the present invention is to provide a control system, an information processing apparatus, a terminal apparatus, a control method, and a computer readable medium which can improve safety while saving time and effort and reducing costs, compared to a conventional configuration.

According to an aspect of the present invention, there is provided a control system including: an information processing apparatus; and a terminal device that performs wireless communication with the information processing apparatus, the control system controlling a status of the information processing apparatus, wherein the terminal device is moved with a user, and includes: a switching request signal transmission section that transmits a switching request signal for performing switching of the information processing apparatus between a first status and a second status, according to a user operation, the information processing apparatus includes: a received signal strength measuring section that measures one or more received signal strengths of one or more signals transmitted from the terminal device in the wireless communication; and a control section that when the information processing apparatus receives the switching request signal, sets the received signal strength measured by the received signal strength measuring section to a switching threshold value, and switches the information processing apparatus from the second status to the first status when the received signal strength becomes less than the switching threshold value, and switches the information processing apparatus from the first status to the second status when the received signal strength becomes larger than the switching threshold value, wherein the first status is logout status or lock statue, and the second status is login status or unlock status.

According to an aspect of the present invention, there is provided an information processing apparatus including: a received signal strength measuring section that measures a received signal strength at the time of receiving a signal externally transmitted by wireless communication; and a control section that when the information processing apparatus receives, as the signal, a switching request signal for performing switching of the information processing apparatus between the first status and the second status, sets the received signal strength measured by the received signal strength measuring section to a switching threshold value, switches the information processing apparatus from the second status to the first status when the received signal strength becomes less than the switching threshold vale, and switches the information processing apparatus from the first status to the second status when the received signal strength becomes larger than the switching threshold value, wherein the first status is logout status or lock statue, and the second status is login status or unlock status.

According to an aspect of the present invention, there is provided a terminal device which transmits the above-described switching request signal.

According to an aspect of the present invention, there is provided a method for controlling a status of an information processing apparatus in a system which includes the information processing apparatus and a terminal device that performs wireless communication with the information processing apparatus, the method including: using a terminal device moved with a user as the terminal device; transmitting a switching request signal for performing switching of the information processing apparatus between the first status and the second status according to a user operation from the terminal device; measuring one or more received signal strengths of one or more signals which are transmitted from the terminal device in the wireless communication; setting the received signal strength measured by the measuring step to a switching threshold value when the information processing apparatus receives the switching request signal, and performing controlling to switch the information processing apparatus from the second status to the first status when the received signal strength becomes less than the switching threshold value, and to switch the information processing apparatus from the first status to the second status when the received signal strength becomes larger than the switching threshold value, wherein the first status is logout status or lock statue, and the second status is login status or unlock status.

According to an aspect of the present invention, there is provided a computer readable medium which stores a control program for controlling a status of an information processing apparatus in a system which includes the information processing apparatus and a terminal device that performs wireless communication with the information processing apparatus, the terminal device being moved with a user, and the control program causing the terminal device to exert: a switching request signal transmission function that transmits a switching request signal for performing switching of the information processing apparatus between a first status and a second status, according to a user operation, and causing the information processing apparatus to exert: a received signal strength measuring function that measures one or more received signal strengths of one or more signals transmitted from the terminal device in the wireless communication; a threshold value setting function that sets the received signal strength measured by the received signal strength measuring function when the switching request signal is received, to a switching threshold value; and a control function that switches the information processing apparatus from the second status to the first status when the received signal strength becomes less than the switching threshold value, and switches the information processing apparatus from the first status to the second status when the received signal strength becomes larger than the switching threshold value, wherein the first status is logout status or lock statue, and the second status is login status or unlock status.

BRIEF DESCRIPTION OF THE SEVERAL VIEWS OF THE DRAWINGS

A more complete understanding of this application can be obtained when the following detailed description is considered in conjunction with the following drawings, in which.

DETAILED DESCRIPTION OF THE INVENTION

Hereinafter, examples of embodiments of the present invention will be described in detail with reference to the attached drawings.

In this regard, however, the scope of the present invention is not limited to the illustrated example.

With the following embodiments, a status which perform access/browsing restriction in a master device (personal computer) is explained as a logout status, and a state which can access/browsing in a master device (personal computer) is explained as a login status. In this regard, however, the present invention can replace the logout status with a lock status and replace the login status with a unlock status.

[Configuration of Security System]

Figure 1:
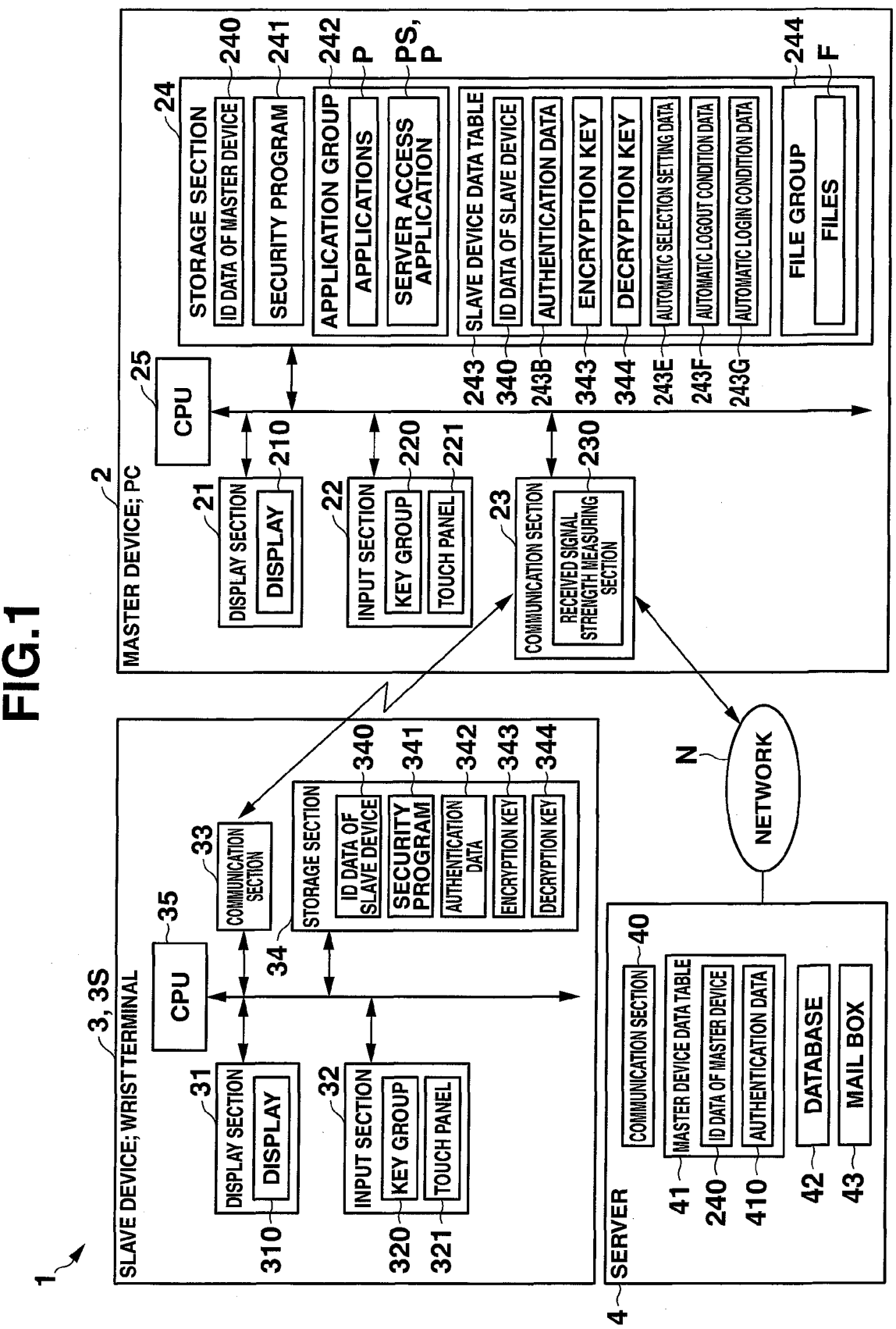
FIG. 1 is a block diagram illustrating a schematic configuration of a security system.

FIG. 1 is a block diagram illustrating a schematic configuration of a security system 1 according to this embodiment.

As illustrated in this diagram, the security system 1 of this embodiment includes a master device 2, a slave device 3, and a server 4.

[Configuration of Personal Computer]

The master device 2 is an information processing apparatus of the present invention.

Figure 8A:
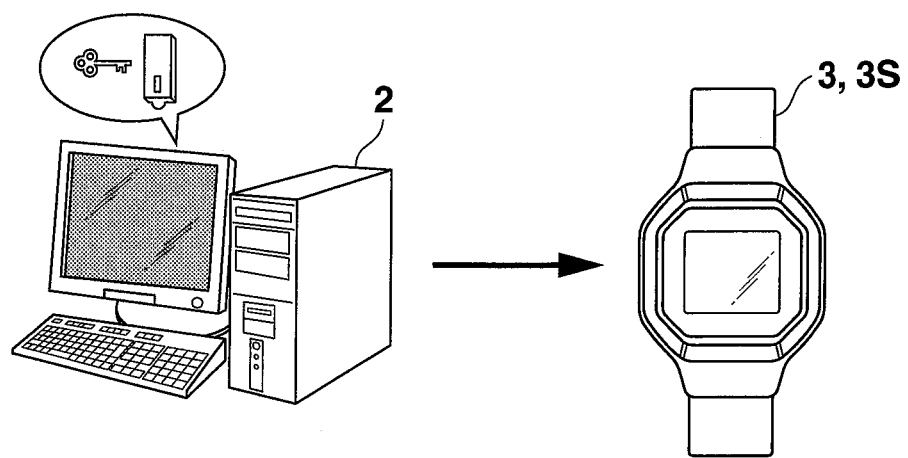
FIG. 8A is a diagram illustrating a situation where the slave device is distant from the master device.
Figure 8B:
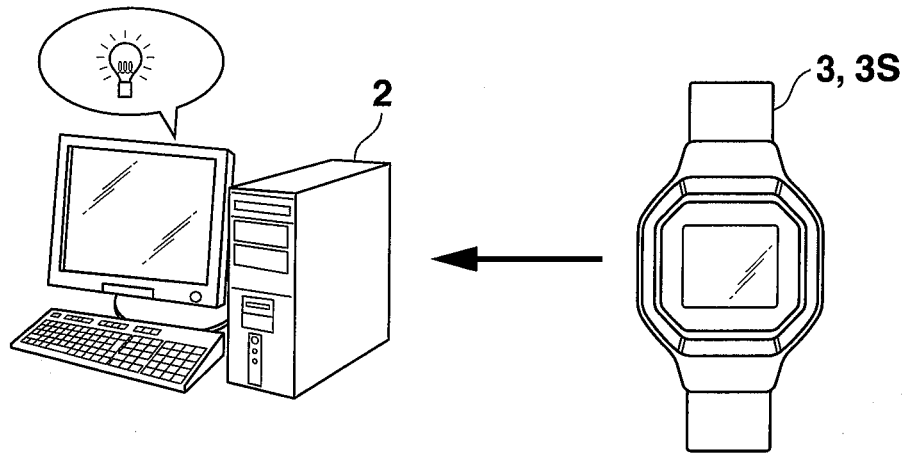
FIG. 8B is a diagram illustrating a situation where the slave device is close to the master device.

In this embodiment, the master device 2 is configured as a personal computer (see after-described FIGS. 8A, 8B).

The master device 2 is configured to include a display section 21, an input section 22, a communication section 23, a storage section 24, a CPU 25, and so on.

The display section 21 is equipped with a display 210, and displays various pieces of information on the display 210 on the basis of display signals input from the CPU 25.

The display 210 may be, for example, integrally formed with a touch panel 221 so that touch operations by a user can be received thereon.

The input section 22 includes a key group 220 and the above-described touch panel 221, and outputs signals corresponding to a kind of pressed key and/or a pressed position on the touch panel 221 to the CPU 25.

The communication section 23 performs data communication with other apparatuses/devices.

In this embodiment, the communication section 23 executes wireless communication with the slave device 3, and executes wire communication with the server 4 via a network N.

Here, there can be used as a system of wireless communication, for example, a wireless LAN such as Wi-Fi, and a communication system using RFID such as Bluetooth (registered trademark) of each class (radio field intensity) and Felica (registered trademark).

Incidentally, in this embodiment, class 1 Bluetooth is used as the wireless communication system.

The communication section 23 includes a received signal strength measuring section 230 which measures a received signal strength of wireless communication.

As the received signal strength measuring section 230, for example, a known device such as a received signal strength indicator (RSSI) may be used.

Figure 2:
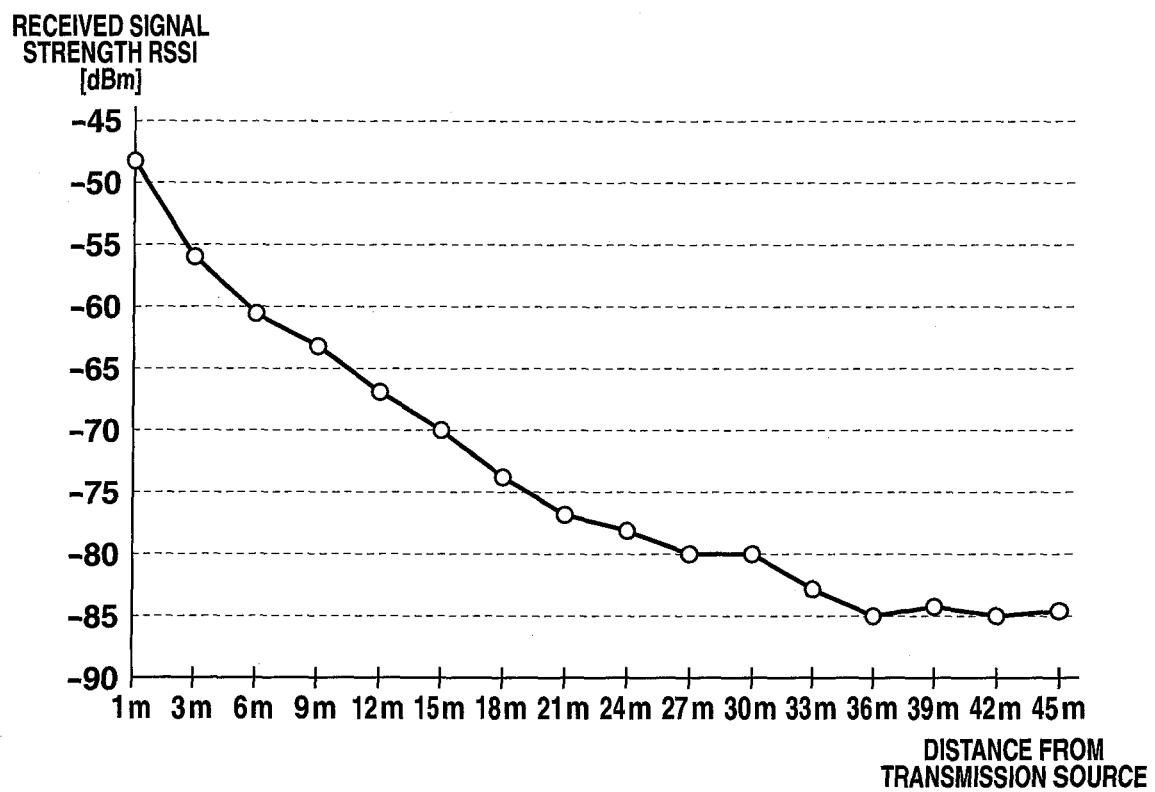
FIG. 2 is a diagram illustrating relationship between a distance from a signal transmission source and a received signal strength.

Here, as illustrated as an example in FIG. 2, the received signal strength of wireless communication becomes small as it becomes far from a signal transmission source.

The storage section 24 is a memory which stores programs and/or data for executing various functions of the master device 2, and which functions as work areas of the CPU 25.

In this embodiment, the storage section 24 stores an ID data 240, a security program 241, an application program group 242, a file group 244, a slave device data table 243, and so on.

The ID data is data relevant to an ID of the master device 2 itself.

Figure 5:
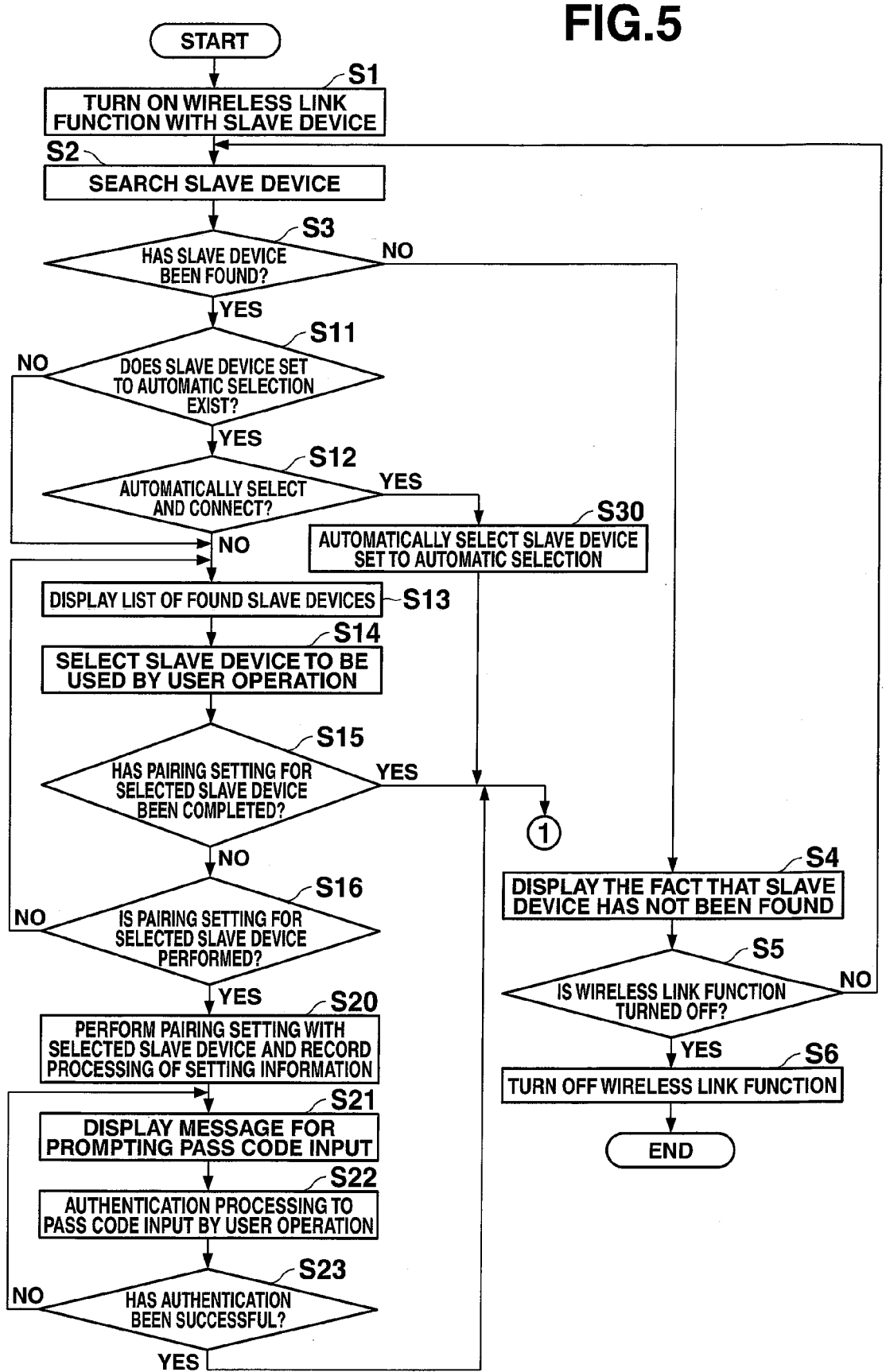
FIG. 5 is a flowchart illustrating a flow of master-device-side security processing.
Figure 6:
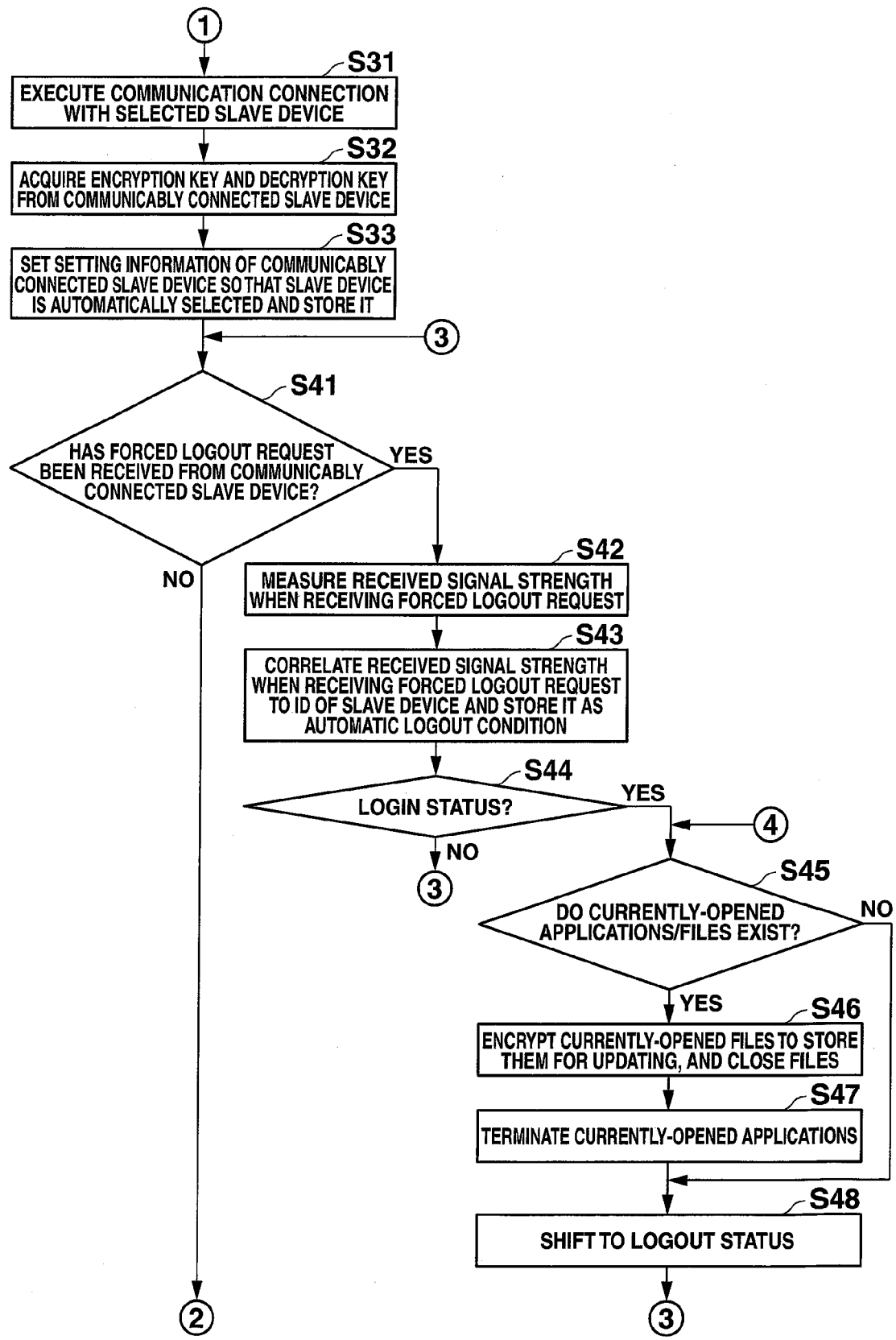
FIG. 6 is a flowchart illustrating a flow of the master-device-side security processing.
Figure 7:
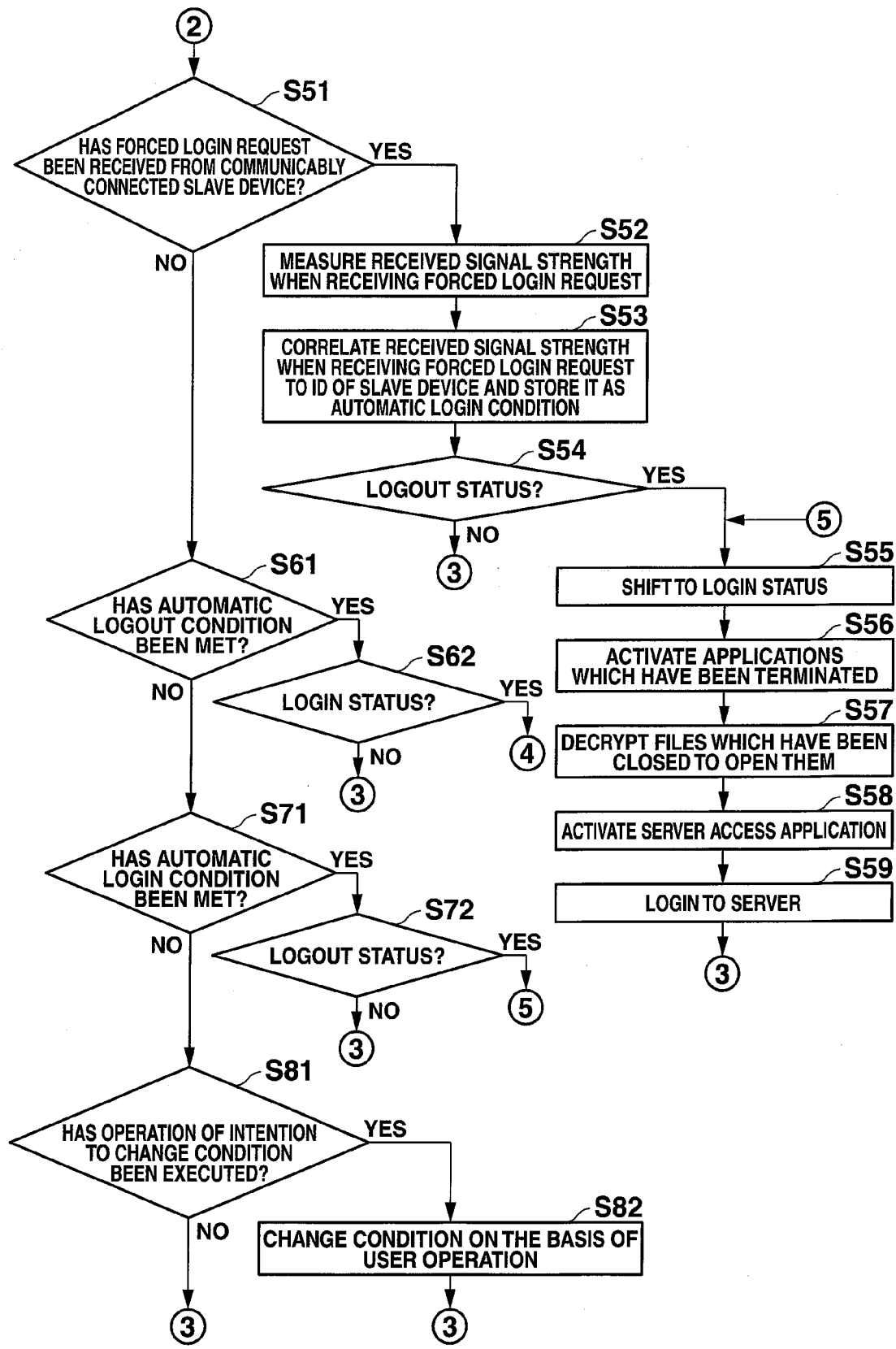
FIG. 7 is a flowchart illustrating a flow of the master-device-side security processing.

The security program 241 is a program for causing the CPU 25 to execute after-mentioned master-device-side security processing (see FIG. 5 to FIG. 7).

The application program group 242 contains plural kinds of application programs P to be executed in the master device 2.

Incidentally, in this embodiment, the plural kinds of application programs P includes a server access application program PS for accessing the server 4.

The file group 244 includes a plurality of files F created by the application programs P.

The slave device data table 243 stores various pieces of information, with respect to a plurality of slave devices 3 to which the master device 2 can communicably connect, so that the information is correlated to each slave device 3, in the after-mentioned master-device-side security processing (see FIG. 5 to FIG. 7).

Concretely, in the slave device data table 243 of this embodiment, an ID data 340 of the slave device 3 concerned, authentication data 243B, an encryption key 343 and a decryption key 344, automatic selection setting data 243E, automatic logout condition data (or automatic lock condition data) 243F, automatic login condition data (or automatic unlock condition data) 243G, etc. are stored so as to be correlated to each of the slave devices 3.

Among them, the authentication data 243B is data to be used for authentication in pairing setting, etc.

The encryption key 343 and the decryption key 344 are keys to be used for encrypting/decrypting the files F in the master device 2, and acquired from the slave device 3 in the after-mentioned master-device-side security processing (see Step S32 in FIG. 6).

The automatic selection setting data 243E is data indicating whether or not each of the slave devices 3 is automatically selected as a communication object in the after-mentioned master-device-side security processing (see FIG. 5 to FIG. 7), which is set to "ON" with respect to the slave device 3 to be automatically selected, and set to "OFF" with respect to the slave device 3 not to be automatically selected. Incidentally, in this embodiment, the slave device 3 for which automatic selection is set to "ON" is only one (1) slave device 3 among those in the slave device data table 243.

The automatic logout condition data 243F and the automatic login condition data 243G are data which indicate conditions which should be met for forcibly switching the master device 2 to the login status or to the logout status in the after-mentioned master-device-side security processing (see FIG. 5 to FIG. 7).

In this embodiment, the automatic logout condition data 243F and the automatic login condition data 243G are threshold values of the received signal strength.

More concretely, with regard to the threshold value of the automatic logout condition data 243F, the master device 2 is switched from the login status (or unlock status) to the logout status (or lock status) when the received signal strength becomes less than the threshold value.

With regard to the threshold value of the automatic login condition data 243G, the master device 2 is switched from the logout status (or lock status) to the login status (or unlock status) when the received signal strength becomes equal to or larger than the threshold value.

The CPU 25 centrally controls the respective sections of the master device 2.

Concretely, the CPU 25 expands the program which has been specified from among the system program and various application programs stored in the storage section 24, and executes various processes in cooperation with the expanded program.

[Configuration of Server]

The server 4 includes a communication section 40, a master device data table 41, a database 42, a mail box 43, and so on.

The communication section 40 performs data communication with other apparatuses/devices connected to the network N.

In this embodiment, the communication section 40 executes wire communication with the master device 2 via the network N.

The master device data table 41 stores various pieces of information for each of the master devices 2 registered in the server 4.

Concretely, in the master device data table 41 of this embodiment, the ID data 240 of the master device 2 concerned, and authentication data 410 for putting the server 4 in a login status (or unlock status) with respect to the master device 2 concerned, are stored so as to be correlated to each of the master devices 2.

The database 42 stores various pieces of data.

The mail box 43 stores emails.

[Configuration of Slave Device]

The slave device 3 is a terminal device of the present invention.

In this embodiment, the slave device 3 is configured, for example, as a wrist wearable type terminal (see after-mentioned FIGS. 8A, 8B) which is mounted on a wrist of a user. Incidentally, the slave device 3 is not limited to the wrist wearable type terminal as long as a user can carry it about or it moves with user.

The slave device 3 is configured to include a display section 31, an input section 32, a communication section 33, a storage section 34, a CPU 35, and so on.

The display section 31 is equipped with a display 310 to display various pieces of information on the display 310 on the basis of display signals input from the CPU 35.

The display 310 may be, for example, integrally formed with a touch panel 321 so that touch operations by a user can be received thereon.

The input section 32 includes a key group 320 and above-described touch panel 321, and outputs signals corresponding to a kind of pressed key and/or a pressed position on the touch panel 321 to the CPU 35.

The communication section 33 performs wireless communication with the master device 2.

The storage section 34 is a memory which stores programs and/or data for executing various functions of the slave device 3, and which functions as work areas of the CPU 35. In this embodiment, the storage section 34 stores ID data 340, a security program 341, authentication data 342, the encryption key 343, the decryption key 344, and so on.

The ID data 340 is data relevant to an ID of the slave device 3 itself.

Figure 3:
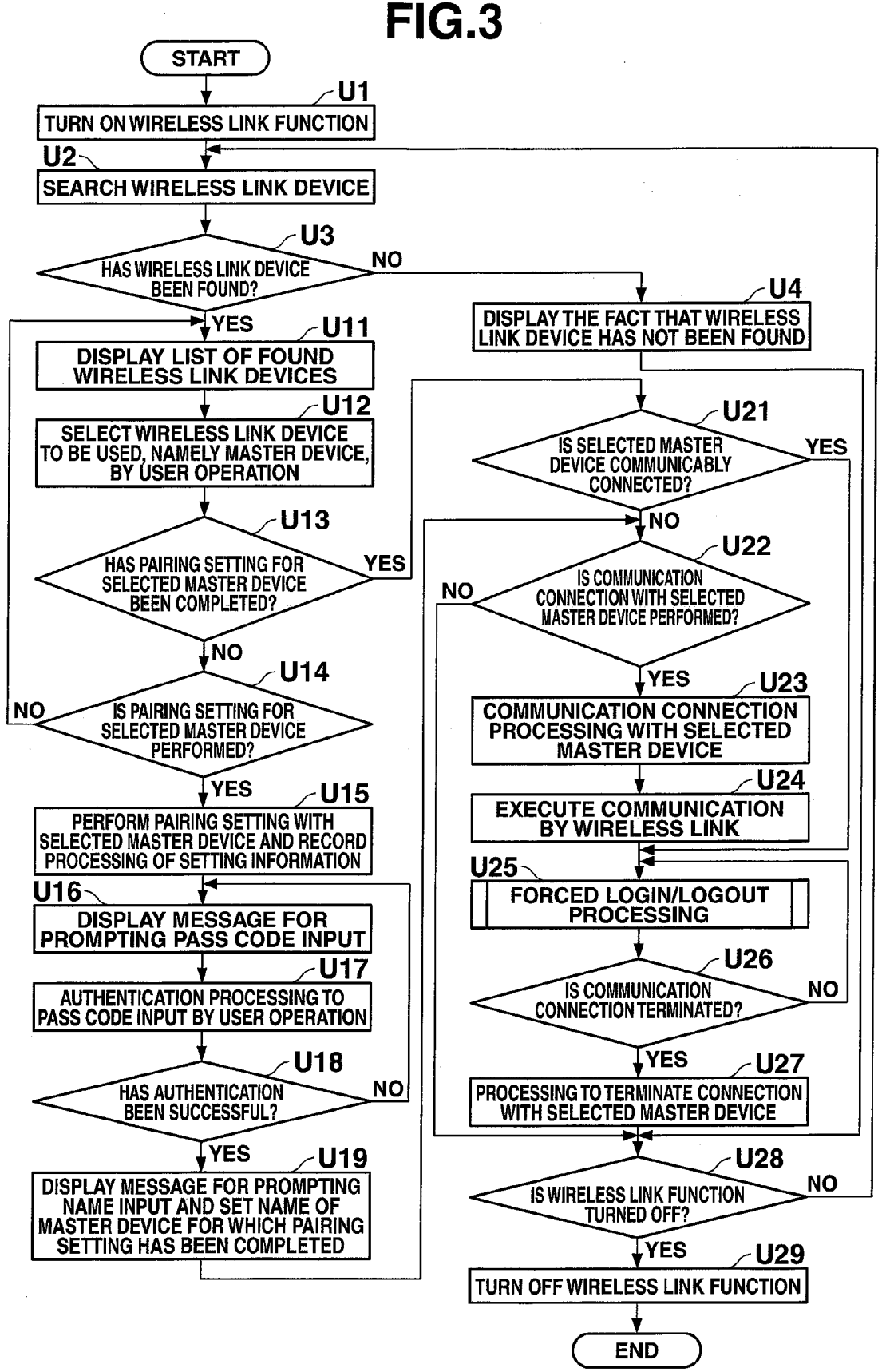
FIG. 3 is a flowchart illustrating a flow of slave-device-side security processing.

The security program 341 is a program for causing the CPU 35 to perform after-mentioned slave-device-side security processing (see FIG. 3).

The authentication data 342 is data to be used for authentication in pairing setting, etc.

The encryption key 343 and the decryption key 344 are keys to be used when the master device 2 encrypts/decrypts the files F.

The CPU 35 centrally controls respective sections of the slave device 3.

Concretely, the CPU 35 expands the program which has been specified from among the system program and various application programs stored in the storage section 34, and executes various processes in cooperation with the expanded program.

[Operation]

<Slave-Device-Side Security Processing in Slave Device>

Next, the slave-device-side security processing to be executed by the slave device 3 will be described with reference to the drawings.

FIG. 3 is a flowchart for explaining an operation of the slave-device-side security processing.

Incidentally, the slave-device-side security processing is executed by cooperation between the security program 341 and the CPU 35 when a user operation of intent to turn on a wireless link function is performed (or when the slave device 3 is activated) and then the security program 341 is read out from the storage section 34 and expanded properly.

As illustrated in FIG. 3, in the slave-device-side security processing, the CPU 35 firstly turns on the wireless link function of the slave device 3 itself (Step U1).

The CPU 35 then searches a wireless link device which is communicable with the slave device 3 (Step U2).

Next, the CPU 35 determines whether or not the communicable wireless link device has been found (Step U3).

When it is determined that the communicable wireless link device has not been found (Step U3; No), the CPU 35 causes the display 310 to display that fact (Step U4) and makes the shift to after-mentioned Step U28.

When it is determined that the communicable wireless link device has been found in Step U3 (Step U3; Yes), the CPU 35 creates a list of pieces of information relevant to the found wireless link device and causes the display 310 to display the created list (Step U11), for example.

Concretely, at that time, the CPU 35 causes the display 310 to display, for each wireless link device, a name and/or ID, the received signal strength, information on whether or not pairing setting has been completed, the connection status between the wireless link device and the slave device 3 itself, and so on.

The CPU 35 then selects the wireless link device which is of the communication object on the basis of a user operation (Step U12).

Incidentally, in this embodiment, the following descriptions are based on the premise that a user selects the master device 2 at this stage.

The CPU 35 next determines whether or not pairing setting for the selected master device 2 has been completed by reference to the authentication data 342 in the storage section 34 (Step U13).

When it is determined that paring setting for the master device 2 has been completed in Step U13 (Step U13; Yes), the CPU 35 determines whether or not the slave device 3 has already been communicably connected to the master device 2 (Step U21).

When it is determined that the slave device 3 has already been communicably connected to the master device 2 in Step U21 (Step U21; Yes), the CPU 35 makes the shift to after-mentioned Step U25.

When it is determined that the slave device 3 has not yet been communicably connected to the master device 2 in Step U21 (Step U21; No), the CPU 35 determines whether or not a user operation of intent to communicably connect to the selected master device 2 has been performed (Step U22).

When a user operation of intent not to communicably connect to the master device 2 is performed in Step U22 (Step U22; No), the CPU 35 makes the shift to after-mentioned Step U28.

When the user operation of intent to communicably connect to the master device 2 is performed in Step U22 (Step U22; Yes), the CPU 35 executes communication connection processing with the selected master device 2 (Step U23). By this, the CPU 35 performs communication using a wireless link with the selected master device 2 (Step U24).

Next, the CPU 35 performs forced login/logout processing (or forced unlock/lock processing) (Step U25).

Figure 4:
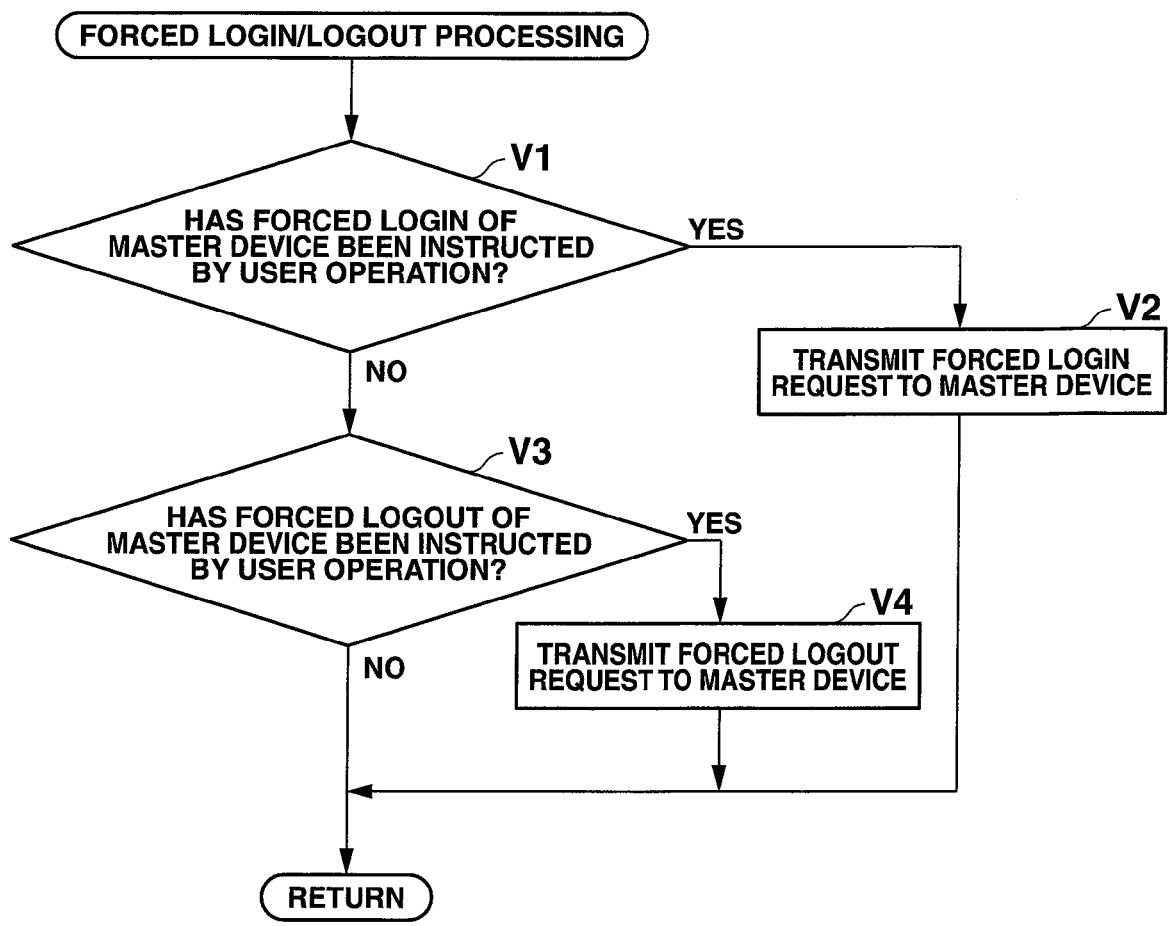
FIG. 4 is a flowchart illustrating a flow of forced login/logout processing.

Concretely, as illustrated in FIG. 4, the CPU 35 firstly determines whether or not the user operation of intent to execute forced login request (or forced unlock request) with respect to the master device 2 has been performed (Step V1), in the forced login/logout processing.

When it is determined that the user operation of intent to execute the forced login request has been performed in Step V1 (Step V1; Yes), the CPU 35 transmits a forced login request signal (or a forced unlock request signal) to the master device 2 (Step V2), and terminates the forced login/logout processing.

Incidentally, the forced login request signal transmitted at that time is received by the master device 2 in the after-mentioned master-device-side security processing (see Step S51 in FIG. 7).

When it is determined that the user operation of intent to execute the forced login request has not been performed in Step V1 (Step V1; No), the CPU 35 determines whether or not the user operation of intent to execute forced logout request (or forced lock request) has been performed (Step V3).

When it is determined that the user operation of intent to execute the forced logout request has not been performed in Step V3 (Step V3; No), the CPU 35 terminates the forced login/logout processing.

When it is determined that a user operation of intent to execute the forced logout request has been performed in Step V3 (Step V3; Yes), the CPU 3'5 transmits a forced logout request signal (or a forced lock request signal) to the master device 2 (Step V4), and terminates the forced login/logout processing. Incidentally, the forced logout request signal transmitted at that time is received by the master device 2 in the after-mentioned master-device-side security processing (see Step S41 in FIG. 6).

When the above forced login/logout processing in Step U25 is terminated, as illustrated in FIG. 3, the CPU 35 next determines whether or not the user operation of intent to terminate communication connection has been performed (Step U26).

When it is determined that the user operation of intent to terminate the communication connection has not been performed in Step U26 (Step U26; No), the CPU 35 makes the shift to the above-described Step U25.

By this, the processes of Steps U25 to U26 are repeatedly performed in the slave device 3 unless a user executes the operation of intent to terminate communication connection.

While Steps U25 to U26 are repeatedly performed, the CPU 35 transmits a signal (beacon) to the master device 2, for example, every time a predetermined time has passed.

A user wearing the slave device 3 can arbitrarily come close to and/or moves away from the master device 2 while Steps U25 to U26 are repeatedly performed as described above.

When the user operation of intent to terminate communication connection has been performed in Step U26 (Step U26; Yes), the CPU 35 executes processing for terminating communication connection with the master device 2 (Step U27).

Next, the CPU 35 determines whether or not a user operation of intent to turn off the wireless link function has been performed (Step U28).

When it is determined that the user operation of intent to turn off the wireless link function has not been performed in Step U28 (Step U28; No), the CPU 35 makes the shift to above-described Step U2.

When it is determined that the user operation of intent to turn off the wireless link function has been performed in Step U28 (Step U28; Yes), the CPU 35 turns off the wireless link function of the slave device 3 itself (Step U29), and terminates the slave-device-side security processing.

When it is determined that pairing setting for the master device 2 has not been completed in above-described Step S13 (Step S13; No), the CPU 35 determines whether or not a user operation of intent to execute pairing setting for the selected master device 2 has been performed (Step U14).

When it is determined that a user operation of intent not to execute pairing setting for the master device 2 has been performed in Step U14 (Step U14; No), the CPU 35 makes the shift to above-described Step U11.

When it is determined that the user operation of intent to execute pairing setting for the master device 2 has been performed in Step U14 (Step U14; Yes), the CPU 35 performs pairing setting with the selected master device 2, and causes the storage section 34 to store the setting information as the authentication data 342 (Step U15).

Next, the CPU 35 causes the display 310 to display a message for prompting a user to input a pairing code (PIN code, pass code) (Step U16).

The CPU 35 then performs authentication processing of the pairing code input by the user operation (Step U17).

The CPU 35 then determines whether or not the authentication has been successful (Step U18).

When it is determined that the authentication has been unsuccessful in Step S18 (Step U18; No), the CPU 35 makes the shift to above-described Step U16.

When it is determined that the authentication has been successful in Step U18 (Step U18; Yes), the CPU 35 causes the display 310 to display a message for prompting a user to input a name of the selected device. After that, the CPU 35 sets the name of the selected device according to the user operation (Step U19), and then makes the shift to above-described Step U22.

In this regard, however, the processing of Step U19 is arbitrary and may be omitted.

<Master-Device-Side Security Processing in Master Device>

The master-device-side security processing to be executed by the master device 2 will be subsequently described with reference to the drawings.

FIG. 5 to FIG. 7 are flowcharts for explaining an operation of the master-device-side security processing in the master device 2.

Incidentally, the master-device-side security processing is executed by cooperation between the security program 241 and the CPU 25 when a user performs an operation of intent to turn on a wireless communication function via the input section 22 and then the security program 241 is read out from the storage section 24 to be expanded properly.

In this embodiment, the following descriptions are based on the premise that wireless link devices which can wirelessly communicate with the master device 2 are only a plurality of slave devices 3 for simplification of the descriptions.

As illustrated in FIG. 5, the CPU 25 firstly turns on the wireless link function with the slave device 3 in the master-device-side security processing (Step S1).

After that, the CPU 25 searches the slave device 3 (Step S2).

The CPU 25 then determined whether or not the slave device 3 has been found (Step S3).

When it is determined that the slave device 3 has not been found in Step S3 (Step S3; No), the CPU 25 causes the display 310 to display that fact (Step S4).

Next, the CPU 25 determines whether or not a user operation of intent to turn off the wireless link function has been performed (Step S5)

When it is determined that the user operation of intent to turn off the wireless link function has not been performed in Step S5 (Step S5; No), the CPU 25 makes the shift to above-described Step S2.

When it is determined that the user operation of intent to turn off the wireless link function has been performed in Step S5 (Step S5; Yes), the CPU 25 turns off the wireless link function of the master device 2 itself (Step S6), and terminates the master-device-side security processing.

When it is determined that the slave device 3 has been found in above-described Step S3 (Step S3; Yes), the CPU 25 determines whether or not the slave device 3 for which the automatic selection setting data 243E is set to "ON" has been found by reference to the client data table 243 (Step S11).

When it is determined that the slave device 3 for which the automatic selection setting data 243E is set to "ON" has not been found in Step S11 (Step S11; No), the CPU 25 makes the shift to after-mentioned Step S13.

When it is determined that the slave device 3 for which the automatic selection setting data 243E is set to "ON" has been found in Step S11 (Step S11; Yes), the CPU 25 determines whether or not a user operation of intent to automatically select the slave device 3 (for which the automatic selection setting data 243 is set to "ON", and which has been found in Step S2) and to connected to the selected slave device 3 has been performed (Step S12).

When it is determined that the user operation of intent to automatically select the slave device 3, for which the automatic selection setting data 243E is set to "ON", and which has been found in Step S2, and to connect to the selected slave device 3 has been performed in Step S12 (Step S12; Yes), the CPU 25 automatically selects the slave device 3 (hereinafter referred to as a selected slave device 3S) as a communication object (Step S30). After that, the CPU 25 makes the shift to after-mentioned Step S31 as illustrated in FIG. 6.

As illustrated in FIG. 5, when it is determined that a user operation of intent not to automatically select or connect to the slave device 3, for which the automatic selection setting data 243E is set to "ON" and which has been found in Step S2, has been performed in above-described Step S12 (Step S12; No), the CPU 25 makes, for example, a list of pieces of information relevant to the slave device 3 which has been found in Step S2, and causes the display 210 to display the list (Step S13).

Concretely, at that time, the CPU 25 makes the display 210 display a name/ID, received signal strength, information on whether or not pairing setting has been completed, connection status between the slave device 3 and the master device 2 itself, etc., for each slave device 3.

Next, the CPU 25 selects the slave device 3 which is of the communication object on the basis of the user operation (Step S14).

The CPU 25 then determines whether or not the pairing setting for the selected slave device 3 (hereinafter referred to as a selected slave device 3S) has been completed by reference to the authentication data 243B in the client data table 243 (Step S15).

When it is determined that the pairing setting for the selected slave device 3 has been completed in Step S15 (Step S15; Yes), the CPU 25 makes the shift to after-mentioned Step S31, as illustrated in FIG. 6.

As illustrated in FIG. 5, when it is determined that the pairing setting for the selected slave device 3S has not been completed in Step S15 (Step S15; No), the CPU 25 causes the display 210 to display a message for asking whether or not pairing setting should be performed, and determines whether or not a user operation of intent to perform pairing setting for the selected slave device 3S has been performed (Step S16).

When a user operation of intent not to perform pairing setting for the selected slave device 3S has been performed in Step S16 (Step S16; No), the CPU 25 makes the shift to above-described Step S13.

When the user operation of intent to perform pairing setting for the selected slave device 3S has been performed in Step S16 (Step S16; Yes), the CPU 25 performs pairing setting with the selected device and causes the storage section 24 to store the setting information as the authentication data 243B (Step S20).

Next, the CPU 25 causes the display 210 to display the message for prompting a user to input the pairing code (PIN code, pass code) (Step S21).

The CPU 25 then executes authentication processing of the pairing code which has been input according to the user operation (Step S22).

The CPU 25 then determines whether or not the authentication has been successful (Step S23).

When it is determined that the authentication has been unsuccessful in Step S23 (Step S23; No), the CPU 25 makes the shift to above-described Step S21.

When it is determined that the authentication has been successful in Step S23 (Step S23; Yes), as illustrated in FIG. 6, the CPU 25 performs communication connection processing with the selected slave device 3S and executes communication using the wireless link (Step S31).

Next, the CPU 25 receives the encryption key 343 and decryption key 344 from the selected slave device 3S, and stores them in the client data table 243 so that the encryption key 343 and decryption key 344 are correlated with the ID data 340 of the selected slave device 3S (Step S32).

The CPU 25 then sets the automatic selection setting data 243E of the selected slave device 3S to "ON" and sets the pieces of automatic selection setting data 243E of the other slave devices 3 to "OFF" in the slave device data table 243 (Step S33).

Next, the CPU 25 determines whether or not the forced logout request signal transmitted by the above-described forced login/logout processing (Step U25) has been received from the selected slave device 3 (Step S41; see the above-described Step V2 in FIG. 4).

When it is determined that the forced logout request signal has been received in Step S41 (Step S41; Yes), the CPU 25 causes the received signal strength measuring section 230 to measure the received signal strength at the time of receiving the forced logout request signal (Step S42).

The CPU 25 then sets the measured received signal strength as a threshold value of the condition for switching to the logout status, and updates the automatic logout condition data 243F correlated to the selected slave device 3S in the slave device data table 243 (Step S43).

Here, in the case that above-described Step S41 has been performed multiple times and the forced logout request signal has been received from the selected slave device 3S multiple times, the CPU 25 updates the automatic logout condition data 243F to the newly measured received signal strength in Step S43, for example, when the newly measured received signal strength is less than the threshold value of the received signal strength indicated by the current automatic logout condition data 243F.

By this, in the case that the forced logout request signal has been received from the selected slave device 3 multiple times, the minimum received signal strength among the received signal strengths measured at the time of receiving the forced logout request signals is set as the threshold value of the switching condition, and stored in the slave device data table 243.

Next, the CPU 25 determines whether or not the master device 2 is currently in a login status (Step S44).

When it is determined that the master device 2 is not in the login status in Step S44 (Step S44; No), the CPU 25 makes the shift to above-described Step S41.

When it is determined that the master device 2 is in the login status in Step S44 (Step S44; Yes), the CPU 25 determines whether or not currently-opened application programs P and/or files F exist (Step S45).

When it is determined that the currently-opened application programs P and/or files F do not exist, in Step S45 (Step S45; No), the CPU 25 makes the shift to after-mentioned Step S48.

When it is determined that the currently-opened application programs P and/or files F exist, in Step S45 (Step S45; Yes), the CPU 25 encrypts the currently-opened files F by using the encryption key 343 correlated to the selected slave device 3S in the slave device data table 243 to store them in the storage section 24, and closes the files F (Step S46).

Next, the CPU 25 terminates the currently-opened application programs P (Step S47).

The CPU 25 then switches the master device 2 itself from the login status to the logout status (Step S48), and makes the shift to above-described Step S41.

When it is determined that the forced logout request signal has not been received from the selected slave device 3S in above-described Step S41 (Step S41; No), as illustrated in FIG. 7, the CPU 25 determines whether or not the forced login request signal transmitted by the above-described forced login/logout processing (Step U25) has been received from the selected slave device 3S (Step S51; see above-described Step V4 in FIG. 4).

When it is determined that the forced login request signal has been received in Step S51 (Step S51; Yes), the CPU 25 causes the received signal strength measuring section 230 to measure the received signal strength at the time of receiving the forced login request signal (Step S52).

The CPU 25 then sets the measured received signal strength as a threshold value of the condition for switching to the login status, and updates the automatic login condition data 243G correlated to the selected slave device 3S in the slave device data table 243 (Step S53).

Here, in the case that above-described Step S51 has been performed multiple times and the forced login request signal has been received from the selected slave device 3S multiple times, the CPU 25 updates the automatic login condition data 243G to newly measured received signal strength in Step S53, for example, when the newly measured received signal strength is less than the threshold value of the received signal strength indicated by the current automatic login condition data 243G.

By this, in the case that the forced login request signal has been received from the selected slave device 3 multiple times, the minimum received signal strength among the received signal strengths measured at the time of receiving the forced login request signals is set as the threshold value of the switching condition, and stored in the slave device data table 243.

Next, the CPU 25 determines whether or not the master device 2 is currently in a logout status (Step S54).

When it is determined that the master device 2 is not in the logout status (Step S54; No), the CPU 25 makes the shift to above-described Step S41 as illustrated in FIG. 6.

As illustrated in FIG. 7, when it is determined that the master device 2 is in the logout status in Step S54 (Step S54; Yes), the CPU 25 switches the master device 2 itself from the logout status to the login status (Step S55).

Next, the CPU 25 activates the application programs P which have been terminated at the time of last switching to the logout status (Step S56).

The CPU 25 then reads out the files F which have been closed at the time of last switching to the logout status, from the storage section 24, to open the files F (Step S57).

More concretely, in Step S57, the CPU 25 decrypt the files F by using the decryption key 344 correlated to the selected slave device 3S in the slave device data table 243 to open the files F.

By these Steps S56 to S57 and above-described Steps S46 to S47, the process contents, which have been executed at the time of last switching from the login status to the logout status, are resumed when switching the master device 2 from the logout status to the login status again.

Next, the CPU 25 activates the server access application program PS (Step S58).

The CPU 25 then logs in to the server 4 (Step S59).

After that, the CPU 25 makes the shift to above-described Step S41 as illustrated in FIG. 6.

Incidentally, when Step S59 is performed, the server 4 executes login authentication for the master device 2 by reference to the master device data table 41.

After the master device 2 logs in to the server 4, a user can arbitrary access to the database 42 and/or the mail box 43 of the server 4.

As illustrated in FIG. 7, when it is determined that the forced login request signal has not been received in above-described Step S51 (Step S51; No), the CPU 25 refers to the automatic logout condition data 243F correlated to the selected slave device 3S in the slave device data table 243, and at the same time, causes the received signal strength measuring section 230 to measure the received signal strength of the signal from the selected slave device 3.

The CPU 25 then determines whether or not the logout condition indicated by the automatic logout condition data 243F has been met, namely whether or not the received signal strength is less than the threshold value indicated by the automatic logout condition data 243F (Step S61).

When it is determined that the logout condition has been met in Step S61 (Step S61; Yes), the CPU 25 determines whether or not the master device 2 is currently in the login status (Step S62).

When it is determined that the master device 2 is not in the login status in Step S62 (Step S62; No), as illustrated in FIG. 6 and FIG. 7, the CPU 25 makes the shift to above-described Step S41.

When it is determined that the master device 2 is in the login status in Step S62 (Step S62; Yes), the CPU 25 makes the shift to above-described Step S45.

By this, as illustrated in FIG. 8A, the master device 2 is automatically switched to the logout status when a user wearing the slave device 3 moves away from the master device 2 while the master device 2 is in the login status.

As illustrated in FIG. 7, when it is determined that the logout condition has not been met in above-described Step S61 (Step S61; No), the CPU 25 refers to the automatic login condition data 243G correlated to the selected slave device 3 in the slave device data table 243, and at the same time, causes the received signal strength measuring section 230 to measure the received signal strength of the signal from the selected slave device 3S.

The CPU 25 then determines whether or not the login condition indicated by the automatic login condition data 243G has been met, namely, whether the received signal strength is equal to or larger than the threshold value indicated by the automatic login condition data 243G (Step S71).

When it is determined that the login condition has been met in Step S71 (Step S71; Yes), the CPU 25 determines whether or not the master device 2 is currently in the logout status (Step S72).

When it is determined that the master device 2 is not in the logout status in Step S72 (Step S72; No), as illustrated in FIG. 6 and FIG. 7, the CPU 25 makes the shift to above-described Step S41.

When it is determined that the master device 2 is in the logout status in Step S72 (Step S72; Yes), the CPU 25 makes the shift to above-described Step S55.

By this, as illustrated in FIG. 8B, the master device 2 is automatically switched to the login status when a user wearing the slave device 3 comes close to the master device 2 while the master device 2 is in the logout status.

As illustrated in FIG. 7, when it is determined that the login condition has not been met in above-described Step S71 (Step S71; No), the CPU 25 determines whether or not a user operation of intent to change a content of the automatic login condition data 243G or the automatic logout condition data 243F has been performed (Step S81).

When a user operation of intent not to change the content of the automatic login condition data 243G or the automatic logout condition data 243F has been performed in Step S81 (Step S81; No), the CPU 25 makes the shift to above-described Step S41, as illustrated in FIG. 7.

As illustrated in FIG. 6 and FIG. 7, when it is determined that the user operation of intent to change the content of the automatic login condition data 243G or the automatic logout condition data 243F has been performed in Step S81 (Step S81; Yes), the CPU 25 updates the content (logout status, threshold value of condition for switching to login status) of the automatic login condition data 243G or the automatic logout condition data 243F in the slave device data table 243 on the basis of the user operation. After that, the CPU 25 makes the shift to above-described Step S41.

As described above, according to this embodiment, as illustrated in Step S41 in FIG. 6 to Step S72 in FIG. 7, in FIG. 8, etc., the received signal strength measured by the received signal strength measuring section 230 when the master device 2 receives the forced logout request signal and/or the forced login request signal from the slave device 3 are stored as the threshold value of the automatic logout condition data 243F and/or the threshold value of the automatic login condition data 243G.

The master device 2 is switched from the login status to the logout status when the received signal strength measured by the received signal strength measuring section 230 becomes less than the threshold value of the automatic logout condition data 243F, and switched from the logout status to the login status when the received signal strength becomes equal to or larger than the threshold value of the automatic login condition data 243G.

Thus, the position (relative position with respect to the master device 2) of the slave device 3 where a user causes the slave device 3 to transmit the forced logout request signal and/or the forced login request signal becomes a boundary position(s) for executing switching of login/logout.

In other words, the master device 2 is put in the login status when a user wears the slave device 3 and comes close to the master device 2 so as to be nearer than the boundary position, and put in the logout status when the user moves away from the master device 2 so as to be farther than the boundary position.

Accordingly, a user can switch the login/logout statuses of the master device 2 only by wearing the slave device 3 and coming close to or moving away from the master device 2.

Therefore, unlike the conventional case where a user inputs an ID and a password for performing login authentication, and unlike the conventional case where a hardware key such as an IC card and a USB memory is connected to a personal computer for performing authentication, it becomes possible to save the effort of remembering the password and/or owning/carrying the hardware key. Thus, compared to the conventional cases, time and effort of ensuring security can be reduced. Moreover, compared to the case that a user executes a logout operation, time and effort of ensuring security can be reduced because a user can switch the master device 2 to the logout status only by wearing the slave device 3 and moves away from the master device 2.

Moreover, unlike the conventional case where a user inputs the ID and the password for performing login authentication, it is possible to prevent a password input operation from being peeked by other people and/or to prevent the password from being cracked, because switching to the login status can be executed without inputting the password by a user.

Furthermore, unlike the conventional case where the hardware key such as an IC card and a USB memory is connected to a personal computer for executing authentication, it is possible to prevent the hardware key from being stolen, because the slave device 2 is mounted on a user and unlikely to be stolen.

Thus, security can be improved compared to the conventional case.

Additionally, compared to the case that the master device 2 is switched to the logout status when a predetermined time has passes, security can be improved because a user can switch the master device 2 only by wearing the slave device 3 and moving away from the master device 2.

Moreover, because switching to the login status can be executed without inputting the password by a user and without performing biometric authentication by the master device 2, it is possible to reduce the time required to execute switching to the login status, compared to the conventional case which requires the above processing.

Furthermore, because security can be ensured by the received signal strength measuring section 230, the slave device data table 243, etc. which are equipped with the master device 2, and the slave device 3, costs can be reduced compared to the conventional case which performs biometric authentication.

As illustrated in Step 41 in FIG. 6 to Step S72 in FIG. 7, etc., the master device 2 is switched from the login status to the logout status when the received signal strength measured by the received signal strength measuring section 230 becomes less than the threshold value of the automatic logout condition data 243F, and the master device 2 is switched from the logout status to the login status when the received signal strength becomes equal to or larger than the threshold value of the automatic login condition data 243G. Thus, a boundary position for switching the master device 2 to the login status and a boundary position for switching the master device 2 to the logout status can be different from each other.

Therefore, it is possible, for example, to make the master device 2 less likely to be switched from the login status to the logout status, and less likely to be switched from the logout status to the login status, by setting the threshold value of the automatic logout condition data 243F to be lower than the threshold value of the automatic login condition data 243G so that the boundary position for switching to the logout status is farther than the boundary position for switching to the login status, with respect to the master device 2. In this case, the master device 2 can be prevented from automatically being switched to the login status when a user is distant from the master device 2, and thereby security can be further improved.

Additionally, in this case, the master device 2 can be prevented from automatically being switched to the logout status when a user is close to the master device 2. It is therefore possible to reduce the time required to automatically switch the master device 2 to the logout status and/or to then return the master device 2 to the login status again.

As illustrated in Step S43 in FIG. 6, in Step S53 in FIG. 7, etc., in the case that the forced logout request signal is received by the master device 2 multiple times, the minimum received signal strength, among the received signal strengths measured at the time of receiving the forced logout request signals, is stored as the threshold value of the automatic logout condition data 243F. By this, when a user causes the slave device 3 to transmit the forced logout request signals at plural positions around the master device 2, among these positions, a position at which the received signal strength becomes lowest with respect to the master device 2, namely the furthest position from the master device 2 in general, becomes the boundary position for switching the master device 2 to the logout status.

Thus, a user can surely prevent the master device 2 from automatically being switched to the logout status when the user is close to the master device 2, by setting the boundary position as far away from the master device 2 as possible through a trial and error process.

By this, it is possible to reduce the time required to automatically switch the master device 2 to the logout status, and/or to then return the master device 2 to the login status again.

Similarly, in the case that the forced login request signal is received by the master device 2 multiple times, the minimum received signal strength among the received signal strengths measured at the time of receiving the forced login request signals is stored as the threshold value of the automatic login condition data 243G. By this, when a user causes the slave device 3 to transmit the forced login request signals at plural positions around the master device 2, among these positions, a position at which the received signal strength becomes lowest with respect to the master device 2, namely the furthest position from the master device 2 in general, becomes the boundary position for switching the master device 2 to the login status.

Thus, a user can swiftly switch the master device 2 to the login status when the user comes close to the master device 2, by setting the boundary position as far away from the master device 2 as possible through a trial and error process.

As illustrated in Steps S46 to S47 in FIG. 6, in Steps S56 to S57 in FIG. 7, etc., the processing contents which have been executed at the time of last switching from the login status to the logout status are resumed at the time of switching from the logout status to the login status in the master device 2. Thus, in the case that the master device 2 is switched to the logout status and then switched to the login status again, operations/works which have been executed by a user in the master device 2 in the previous login status can be swiftly started again.

As illustrated in Step S46 in FIG. 6, in Step S56 in FIG. 7, etc., at the time of switching from the login status to the logout status, the files F which are being opened at that time are encrypted and stored. Then, at the time of switching from the logout status to the login status, the files F which have been opened at the time of last switching from the login status to the logout status are read out, and decrypted to be opened.

This prevents the files F from being accessed in the logout state, and thereby security can be further improved.

As illustrated in Step S32 in FIG. 6, etc., the encryption key 343 and the decryption key 344 transmitted from the slave device 3 to the master device 2 are used for encryption and decryption, it is possible to more surely prevent the files F from being accessed in the logout status, and thereby security can be further improved.

As illustrated in Step S82 in FIG. 7, etc., because the threshold values in the automatic logout condition data 243F and the automatic login condition data 243G are changed by the user operations, the boundary position for switching to the logout status and/or the boundary position for switching to the login status can be arbitrary changed.

As illustrated in Steps S58 to S59 in FIG. 7, etc., the server access application program PS is executed at the time of switching from the logout status to the login status so that the master device 2 logs in to the server 4, the effort of executing a login operation by a user with respect to the server 4 at the time of switching to the login status can be saved.

Incidentally, it is a matter of course that detailed configurations and detailed operations of the respective components of the security system 1 according to the above-described embodiment can be arbitrary changed without departing from the spirit of the present invention.

For example, the information processing apparatus of the present invention can be applied to not only the personal computer, but also all electronic devices such as a scientific electronic calculator, an electronic dictionary, a cellular phone, a Personal Digital Assistant (PDA), and a game machine.

The above embodiment describes the configuration where the master device 2 stores the security program 241 and the slave device 3 stores the security program 341. However, there can also be adopted the configuration where the security programs 241, 341 are collectively stored in the slave device 3 at the time of product shipment of the master device 2 and the slave device 3, and the security program 241 is transmitted to the master device 2 at the time of pairing setting between the master device 2 and the slave device 3. On the contrary, the configuration where the security programs 241, 341 are collectively stored in the master device 2, and the security program 341 is transmitted to the slave device 3 at the time of pairing setting between the master device 2 and the slave device 3 can be adopted. Also the case where the security programs 241, 341 are collectively stored in a memory card, compact disk (CD), and the like which are detachable/attachable from/to the master device 2, and the security program 341 is transmitted to the slave device 3 and the security program 241 is transmitted to the master device 2 at the time of pairing setting between the master device 2 and the slave device 3 can be adopted.

The above embodiment describes the case where the master device 2 stores the two pieces of condition data, namely the automatic logout condition data 243F and the automatic login condition data 243G, and the master device 2 is switched from the login status to the logout status when the received signal strength is less than the threshold value indicated by the automatic logout condition data 243F, and switched from the logout status to the login status when the received signal strength is equal to or larger than the threshold value indicated by the automatic login condition data 243G.

There can also be adopted the configuration where the master device 2 stores single condition datum, and the master device 2 is switched from the login status to the logout status when the received signal strength is less than the threshold value indicated by the condition datum, and switched from the logout status to the login status when the received signal strength is equal to or larger than the threshold value indicated by the condition datum.

In this case, it is preferable that when the forced logout request signal (forced login request signal) is received from the slave device 3 multiple times, the minimum received signal strength among the received signal strengths measured at the time of receiving the respective request signals is set as the threshold value of the condition for switching login/logout statuses so that the condition datum in the master device 2 is updated.

Furthermore, though the case of using single system (Class 1 Bluetooth) as the wireless communication system of the master device 2 and the slave device 3, it is also possible to use a plurality of wireless communication systems while switching them.

In this case, the automatic logout condition data 243F and the automatic login condition data 243G include kinds of wireless systems to be used, and the threshold values of received signal strengths of the wireless systems.

Additionally, in this case, in above-described Step S82, the contents of the automatic login condition data 243G and the automatic logout condition data 243F, namely the kinds of wireless system and the threshold values of the received signal strengths of the wireless systems are changed in the master device 2.

Furthermore, as a computer readable medium storing programs for executing the above processing, in addition to the ROM, the hard disk, etc., also a non-volatile memory such as a flash memory and a portable recording medium such as a CD-ROM can be adopted. As a medium for providing data of programs via a predetermined communication line, also carrier wave can be adopted.

Although some embodiments of the present invention are described above, the scope of the present invention is not limited to the above embodiments, and includes the scope of the invention described in the claims and equivalents thereof.

What is claimed is:

1. A control system comprising:
   an information processing apparatus; and
   a terminal device that performs wireless communication with the information processing apparatus, the control system controlling a status of the information processing apparatus,
   wherein:
   the terminal device is configured to be held by a user, and includes:
      an identification signal transmission section that transmits an identification signal; and
      a switching request signal transmission section that transmits a first switching request signal for setting a first switching threshold value for switching the information processing apparatus to a first status which is a logout status or a lock status, and a second switching request signal for setting a second switching threshold value for switching the information processing apparatus to a second status which is a login status or an unlock status, according to a user operation,
   the information processing apparatus includes:
      a received signal strength measuring section that measures one or more received signal strengths of one or more signals transmitted from the terminal device in the wireless communication; and
      a control section that (i) sets a first received signal strength of the first switching request signal measured by the received signal strength measuring section to the first switching threshold value when the information processing apparatus receives the first switching request signal, (ii) sets a second received signal strength of the second switching request signal measured by the received signal strength measuring section to the second switching threshold value when the information processing apparatus receives the second switching request signal, (iii) switches the information processing apparatus from the second status to the first status when a third received signal strength of the identification signal becomes less than the set first switching threshold value, the third received signal strength being measured by the received signal strength measuring section when the information processing apparatus receives the identification signal after the first and second switching threshold values are set, and (iv) switches the information processing apparatus from the first status to the second status when the third received signal strength becomes larger than the set second switching threshold value.

2. The control system according to claim 1, wherein
the information processing apparatus further includes a threshold value storage section that stores the first switching threshold value and the second switching threshold value, and
the threshold value storage section stores a minimum received signal strength among a plurality of received signal strengths measured every time the first switching request signal is received, as the first switching threshold, when the information processing apparatus receives the first switching request signal multiple times, and stores a minimum received signal strength among a plurality of received signal strengths measured every time the second switching request signal is received, as the second switching threshold value, when the information processing apparatus receives the second switching request signal multiple times.

3. The control system according to claim 1, wherein the information processing apparatus further includes:
a resume section that resumes a process content, which has been executed at a time of last switching from the second status to the first status, when performing switching from the first status to the second status.

4. The control system according to claim 1, wherein
the terminal device further includes:
a key storage section that stores an encryption key and a decryption key, and
the information processing apparatus further includes:
a file storage section that stores a file;
an encryption section that encrypts a file which is opened at a time of switching from the second status to the first status by using the encryption key transmitted from the terminal device, and causes the file storage section to store the file; and
a decryption section that reads out the file, which has been opened at a time of last switching from the second status to the first status, from the file storage section, and that decrypts and opens the file by using the decryption key transmitted from the terminal device, when performing switching from the first status to the second status.

5. The control system according to claim 1, wherein the information processing apparatus further includes:
a switching threshold value changing section that changes the first and second switching threshold values based on a user operation.

6. The control system according to claim 1, wherein
the information processing apparatus further includes:
a communication section that is communicable with a server via a network;
a server access application executing section that executes a server access application for accessing to the server; and
a server login control section that causes the server access application executing section to execute the server access application to login to the server when performing switching from the first status to the second status.

7. The control system according to claim 1, wherein the switching request signal transmission section transmits the first switching request signal according to a user operation when a distance between the terminal device and the information processing apparatus is a first distance, and transmits the second switching request signal according to a user operation when the distance between the terminal device and the information processing apparatus is a second distance that is shorter than the first distance.

8. An information processing apparatus comprising:
a communication section which is configured to receive a signal transmitted by wireless communication;
a received signal strength measuring section that measures a received signal strength at a time of receiving, with the communication section, a signal externally transmitted by wireless communication; and
a control section that (i) sets a first value to a first switching threshold value when the information processing apparatus receives, as the signal, a first switching request signal for switching the information processing apparatus to a first status which is a logout status or a lock status, (ii) sets a second value different from the first value to a second switching threshold value when the information processing apparatus receives, as the signal, a second switching request signal for switching the information processing apparatus to a second status which is a login status or an unlock status when the received signal strength measured by the received signal strength measuring section is the second value, (iii) switches the information processing apparatus from the second status to the first status when the received signal strength measured by the received signal strength measuring section at a time of receiving an identification signal externally transmitted by wireless communication becomes less than the first switching threshold value, and switches the information processing apparatus from the first status to the second status when the received signal strength measured at the time of receiving the identification signal becomes larger than the second switching threshold value.

9. A terminal device which transmits the first and second switching request signal to the information processing apparatus according to claim 8.

10. The information processing apparatus according to claim 8, wherein the second value is smaller than the first value.

11. A method for controlling a status of an information processing apparatus in a system which includes the information processing apparatus and a terminal device that is configured to be held by a user and that performs wireless communication with the information processing apparatus, the method comprising:
transmitting, from the terminal device, a first switching request signal for setting a first switching threshold value for switching the information processing apparatus to a first status which is a logout status or a lock status, and a second switching request signal for setting a second switching threshold value for switching the information processing apparatus to a second status which is a login status or an unlock status, according to a user operation;

measuring one or more received signal strengths of one or more signals which are transmitted from the terminal device in the wireless communication;

setting a first received signal strength of the first switching request signal measured in the measuring to the first switching threshold value when the information processing apparatus receives the first switching request signal, and setting a second received signal strength of the second switching request signal measured in the measuring to the second switching threshold value when the information processing apparatus receives the second switching request signal;

transmitting an identification signal from the terminal device; and performing control to switch the information processing apparatus from the second status to the first status when a third received signal strength of the identification signal becomes less than the set first switching threshold value, the third received signal strength being measured in the measuring when the information processing apparatus receives the identification signal after the first and second switching threshold values are set, and to switch the information processing apparatus from the first status to the second status when the third received signal strength becomes larger than the set second switching threshold value.

12. The method according to claim 11, further comprising:
storing the first switching threshold value and the second switching threshold value,
wherein the storing includes storing a minimum received signal strength among a plurality of received signal strengths measured every time the first switching request signal is received, as the first switching threshold value, when the information processing apparatus receives the first switching request signal multiple times, and storing a minimum received signal strength among a plurality of received signal strengths measured every time the second switching request signal is received, as the second switching threshold value, when the information processing apparatus receives the second switching request signal multiple times.

13. The method according to claim 11, further comprising:
resuming a process content, which has been executed in the information processing apparatus at a time of last switching from the second status to the first status, by the information processing apparatus, when the information processing apparatus is switched from the first status to the second status.

14. The method according to claim 11,
wherein the terminal device includes a key storage section that stores an encryption key and a decryption key, and
the information processing apparatus includes a file storage section that stores a file, and
wherein the controlling further includes:
encrypting a file which is opened at a time of switching from the second status to the first status by causing the information processing apparatus to use the encryption key transmitted from the terminal device, and causes the file storage section to store the file; and reading out the file which has been opened at a time of last switching from the second status to the first status from the file storage section, and decrypting and opening the file by causing the information processing apparatus to use the decryption key transmitted from the terminal device, when performing switching from the first status to the second status.

15. The method according to claim 11, wherein the first switching request signal is transmitted in the transmitting according to a user operation when a distance between the terminal device and the information processing apparatus is a first distance, and the second switching request signal is transmitted in the transmitting according to a user operation when the distance between the terminal device and the information processing apparatus is a second distance that is shorter than the first distance.

16. A non-transitory computer readable medium which stores a control program for controlling a status of an information processing apparatus and a status of a terminal device in a system which includes the information processing apparatus and the terminal device that perform wireless communication with each other, the terminal device being configured to be held by a user,
wherein the control program is executable by the terminal device to cause the terminal device to perform functions comprising:
a switching request signal transmission function that transmits a first switching request signal for setting a first switching threshold value for switching the information processing apparatus to a first status which is a logout status or a lock status, and a second switching request signal for setting a second switching threshold value for switching the information processing apparatus to a second status which is a login status or an unlock status, according to a user operation; and
an identification signal transmission function that transmits an identification signal, and
wherein the control program is executable by the information processing apparatus to cause the information processing apparatus to perform functions comprising:
a received signal strength measuring function that measures one or more received signal strengths of one or more signals transmitted from the terminal device in the wireless communication;
a threshold value setting function that sets a first received signal strength measured by the received signal strength of the first switching request signal measuring function to the first switching threshold value when the first switching request signal is received, and sets a second received signal strength of the second switching request signal measured by the received signal strength measuring function to the second switching threshold value when the second switching request signal is received; and
a control function that switches the information processing apparatus from the second status to the first status when a third received signal strength of the identification signal becomes less than the set first switching threshold value, the third received signal strength being measured by the received signal strength measuring function when the identification signal is received after the first and second switching threshold value are set, and switches the information processing apparatus from the first status to the second status when the third received signal strength becomes larger than the set second switching threshold value.

17. The computer readable medium according to claim 16, wherein the computer program is further executable by the information processing apparatus to cause the information processing apparatus to perform functions comprising:

a threshold value storage function that stores the first switching threshold value and the second switching threshold value, and wherein the threshold value storage function causes the information processing apparatus to store a minimum received signal strength among a plurality of received signal strengths measured every time the first switching request signal is received, as the first switching threshold value, when the information processing apparatus receives the first switching request signal multiple times, and store a minimum received signal strength among a plurality of received signal strengths measured every time the second switching request signal is received, as the second switching threshold value, when the information processing apparatus receives the second switching request signal multiple times.

18. The computer readable medium according to claim 16, wherein the computer program is further executable by the information processing apparatus to cause the information processing apparatus to perform a function comprising:

a resume function that resumes a process content, which has been executed in the information processing apparatus at a time of last switching from the second status to the first status, when performing switching from the first status to the second status.

19. The computer readable medium according to claim 16, wherein the terminal device includes:

a key storage section that stores an encryption key and a decryption key, and the information processing apparatus includes:

a file storage section that stores a file, and the control program is further executable by the information processing section to perform functions comprising:

an encryption function that encrypts a file which is opened at a time of switching from the second status to the first status by using the encryption key transmitted from the terminal device, and causes the file storage section to store the file; and a decryption function that reads out the file, which has been opened at a time of last switching from the second status to the first status, from the file storage section, and that decrypts and opens the file by using the decryption key transmitted from the terminal device, when performing switching from the first status to the second status.

20. The computer readable medium according to claim 16, wherein the switching request signal transmission function transmits the first switching request signal according to a user operation when a distance between the terminal device and the information processing apparatus is a first distance, and transmits the second switching request signal according to a user operation when the distance between the terminal device and the information processing apparatus is a second distance that is shorter than the first distance.

* * * * *